US007983475B2

(12) United States Patent
Aoki et al.

(10) Patent No.: US 7,983,475 B2
(45) Date of Patent: Jul. 19, 2011

(54) VEHICULAR ACTUATION SYSTEM

(75) Inventors: Hiroshi Aoki, Minato-ku (JP); Hirofumi Mita, Minato-ku (JP); Masato Yokoo, Minato-ku (JP); Yuu Hakomori, Minato-ku (JP)

(73) Assignee: Takata Corporation, Tokyo (JP)

( * ) Notice: Subject to any disclaimer, the term of this patent is extended or adjusted under 35 U.S.C. 154(b) by 881 days.

(21) Appl. No.: 12/000,885

(22) Filed: Dec. 18, 2007

(65) Prior Publication Data

US 2008/0181456 A1 Jul. 31, 2008

(30) Foreign Application Priority Data

Dec. 27, 2006 (JP) ................................ 2006-353195

(51) Int. Cl.
*G06K 9/00* (2006.01)
(52) U.S. Cl. ....................................................... 382/154
(58) Field of Classification Search ........................ None
See application file for complete search history.

(56) References Cited

U.S. PATENT DOCUMENTS 6,014,608 A * 1/2000 Seo ............................... 701/207
6,480,616 B1 11/2002 Hata et al.
6,757,009 B1 6/2004 Simon et al.
6,784,936 B1 * 8/2004 Fukushima et al. ..... 348/333.01
7,245,741 B1 7/2007 Ertl et al.
7,289,645 B2 10/2007 Yamamoto et al.
2003/0079929 A1 5/2003 Takagi et al.
2004/0143440 A1 * 7/2004 Prasad et al. .................. 704/270
2005/0063564 A1 3/2005 Yamamoto et al.

FOREIGN PATENT DOCUMENTS

DE 103 49 568 A1 5/2004
DE 10 2004 038965 A1 3/2005
DE 10 2006 037156 A1 9/2007
JP 2005-254906 9/2005
JP 2005-297637 10/2005
WO WO 2006/109476 10/2006

* cited by examiner

*Primary Examiner* — Daniel G Mariam
*Assistant Examiner* — Elisa M Rice
(74) *Attorney, Agent, or Firm* — Foley & Lardner LLP

(57) ABSTRACT

A vehicular actuation system installed in a vehicle includes an actuation device that includes an operation member manipulated by a vehicle occupant. The system also includes a detecting unit for detecting a three-dimensional image in an operational area of a predetermined range about the operation member. The system also includes a control unit that determines based on the detected three-dimensional image whether or not a palm or back of a hand of the vehicle occupant is present in the operational area. The control unit operates the actuation device when the palm or back of the hand of the vehicle occupant is present in the operational area. The system includes a first operation mode in which the operation member is directly manipulated by the hand of the vehicle occupant to operate the actuation device and a second operation mode in which the actuation device is operated by the control unit.

12 Claims, 7 Drawing Sheets

100
110
PHOTOGRAPHING MEANS
112
3D CAMERA
120
CONTROL MEANS
130
IMAGE PROCESSING UNIT
140
COMPUTING UNIT (MPU)
142
INFORMATION EXTRACTING SECTION
144
DETERMINATION PROCESSING SECTION
150
STORING UNIT
160
INPUT/OUTPUT UNIT
170
ECU
180 (180a)
ACTUATION DEVICE
190
VOICE INPUT UNIT

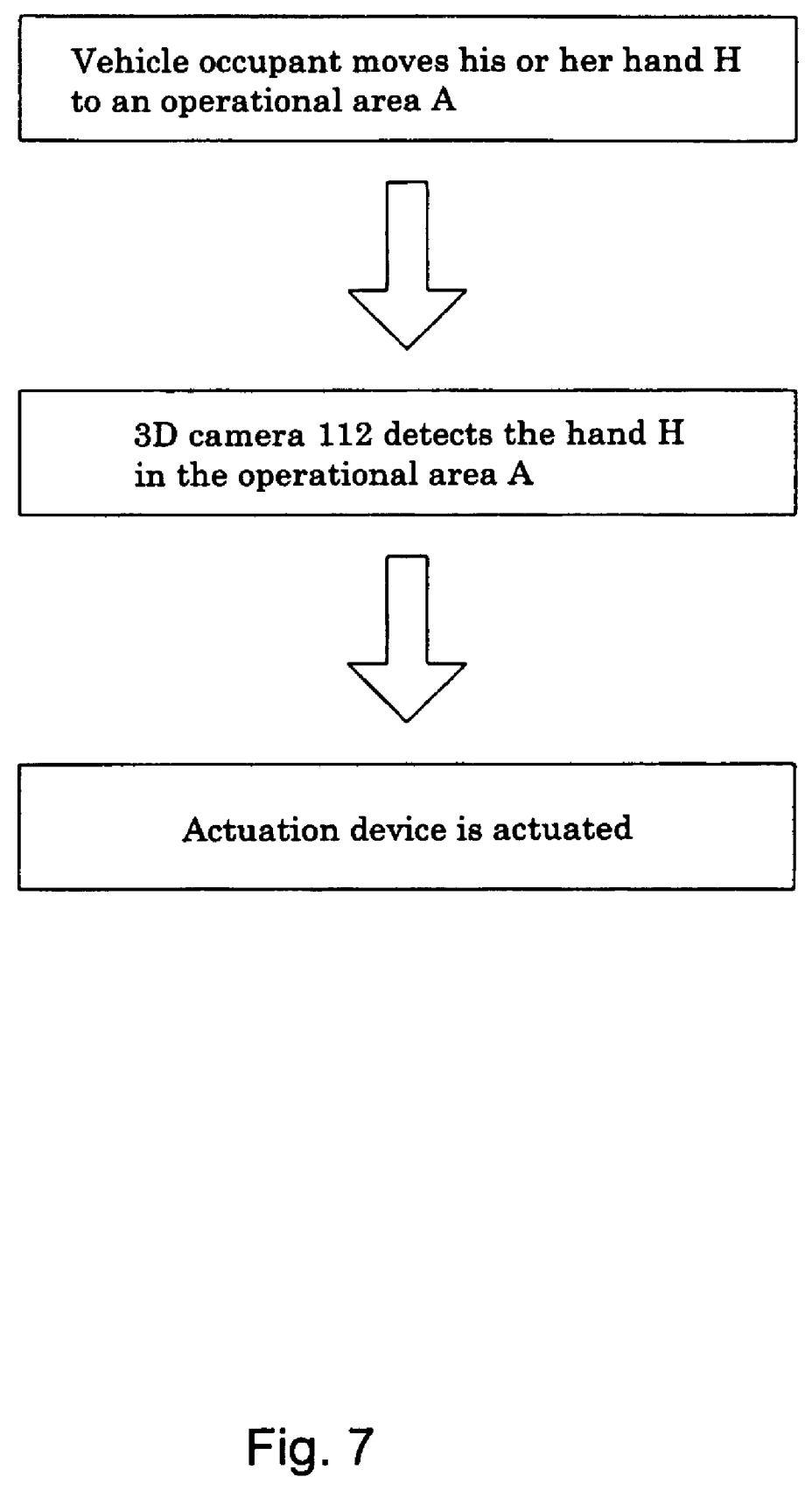

Vehicle occupant moves his or her hand H to an operational area A

↓

3D camera 112 detects the hand H in the operational area A

↓

Actuation device is actuated

Fig. 7

Vehicle occupant moves his or her hand H to an operational area A, with distinctive behavior 3D camera 112 detects the hand H in the operational area A Distinctive behavior of the hand H is detected Actuation device 180 is actuated with a predetermined action

VEHICULAR ACTUATION SYSTEM

BACKGROUND

The present application relates generally to a vehicular actuation system installed in a vehicle and, more particularly, to a technology for developing a vehicular actuation system comprising an actuation device and operation member controlled by a vehicle occupant.

SUMMARY

One disclosed embodiment relates to a vehicular actuation system installed in a vehicle. The vehicular actuation system includes an actuation device that includes an operation member manipulated by a vehicle occupant. The vehicular actuation system also includes a detecting unit for detecting a three-dimensional image in an operational area of a predetermined range about the operation member. The vehicular actuation system also includes a control unit that determines based on the detected three-dimensional image whether or not a palm or back of a hand of the vehicle occupant is present in the operational area. The control unit operates the actuation device when the palm or back of the hand of the vehicle occupant is present in the operational area. The vehicular actuation system includes a first operation mode in which the operation member is directly manipulated by the hand of the vehicle occupant to operate the actuation device and a second operation mode in which the actuation device is operated by the control unit.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 7 is a diagram showing a process flow of how an actuation device is operated based on detection of the palm or back of the hand of the vehicle occupant in the operational area shown in FIG. 6 according to an exemplary embodiment.

DETAILED DESCRIPTION

Figure 1:
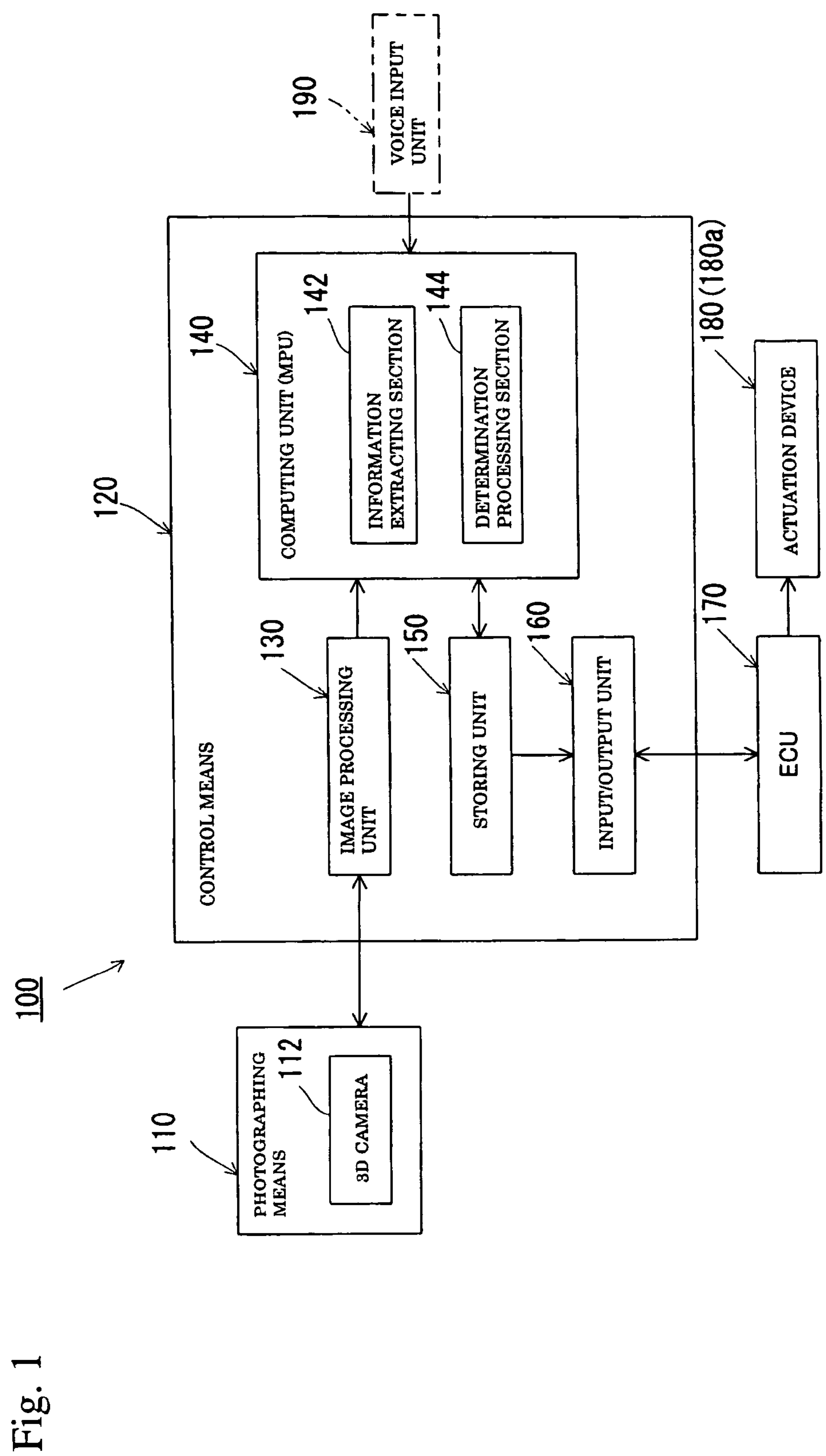
FIG. 1 is an illustration showing a system configuration of a vehicular actuation system according to an exemplary embodiment.

Japanese patent application JP-A-2005-254906 discloses a lighting device as an example of an actuation device operated by a vehicle occupant and is herein incorporated by reference. To operate various actuation devices such as the vehicular lighting device, the vehicle occupant may reach for or look for a switch. Described hereafter, exemplary embodiments describe elements for simplifying of the operation of an actuation device.

In a vehicular actuation system provided with an actuation device to be operated when an operation member for the actuation device is manipulated by a hand of a vehicle occupant, various embodiments may provide a technology that is effective for enabling the simplification of operation for actuating an actuation device.

According to exemplary embodiments of the present invention, an vehicular actuation system may detect a three-dimensional image in an operational area for an operation member, determine based on the detected three-dimensional image whether or not a palm or back of hand of a vehicle occupant is present in the operational area, and actuate an actuation device when it is determined that the palm or back of the hand of the vehicle occupant is present in the operational area.

According to various exemplary embodiments, the vehicular actuation system may be located in an automobile, however according to other exemplary embodiments, the vehicular actuation system may be located in another type of vehicle. The vehicular actuation system typically includes at least an actuation device, a detecting unit, and a control unit.

The actuation device is operated when an operation member for the device is manipulated by a vehicle occupant. According to various exemplary embodiments, the actuation device may include lights located outside and/or inside the vehicle, an air conditioner, side mirrors, a vehicle navigation system, and/or an audio system. The vehicle occupant may include an occupant seated in a driver seat that may operate a steering wheel of the vehicle or an occupant seated in a front or rear passenger seat.

The detecting unit is configured to detect a three-dimensional image in an operational area of a predetermined range about the operation member. The detecting unit may be a 3-D type monocular C-MOS camera, a 3-D type pantoscopic stereo camera, any noncontact-type three-dimensional measuring device, or a 3D scanner. The installation location of the detecting unit may be selected according to the manipulation of the operation member. Typically, the detecting unit may be located in an area around an inner rearview mirror, a dashboard, a ceiling, or a pillar.

The control unit determines, based on the three-dimensional image detected by the detecting unit, whether or not a palm or back of a hand of the vehicle occupant is present in the operational area of the operation member. For purposes of this disclosure, a palm or back of a hand of the vehicle occupant may include any part from a wrist to the end of a hand including fingers. When it is determined that the palm or back of hand of the vehicle occupant is present in the operational area, the control unit determines that the vehicle occupant desires to operate the actuation device corresponding to the operational area. The determination of whether or not the palm or back of a hand of the vehicle occupant is present may be made by determining whether or not the size of the detected part is equal to a palm or back of a hand that has been previously defined. Alternatively, the determination of whether or not the palm or back of a hand of the vehicle occupant is present may be made by determining whether or not there is a detected object of a size that is generally similar to that of a palm or back of a hand in the operational area.

The vehicular actuation system may include at least a first operation mode and a second operation mode. In the first operation mode the operation member may be directly manipulated by the hand of the vehicle occupant to operate the actuation device. In the second operation mode, the actuation device may be operated by non-contact manipulation of the operation member (i.e. without direct manipulation of the operation member), for example the actuation device may be operated by the control unit. Therefore, a vehicle occupant in the driver seat may either select the first operation mode or the second operation mode for operating the actuation device before driving, after driving, and during vehicle stoppage and may select the second operation mode for operating the actuation device during driving.

If a vehicle occupant sitting in a normal driving position attempts to manipulate an operation member of a small size during driving, the occupant may need to look for the operation member and/or may be out of the normal driving position diminishing the vehicle occupant's attention. If the vehicle occupant selects the second operation mode allowing for simple movement of the palm or back of the hand into the operational area around the operation member to operate the actuation device, the vehicle occupant's attention may not be diminished.

By using three-dimensional images, information about the operational area of the operation member may be more precisely detected. If three-dimensional images are used, a higher degree of precision in detection may be present compared to when using two-dimensional images because information may be extracted according to distances even when there is a small difference in color between the background and the vehicle occupant or a small difference in color between the skin and the clothes.

The detecting unit may include a single detecting unit for detecting three-dimensional images in one or more operational areas or may include a plurality of detecting units. When multiple operational areas are used, the operational areas may be areas separate from each other or in respective sections of a single operational area. For example, when controls for at least two actuation devices are conducted by a single photographing device, the operation members of the actuation devices may be positioned close to each other. A first section of the single operational area may be defined as the operational area relating to the actuation of one of the actuation devices and a second section of the single operational area may be defined as the operational area relating to the actuation of the other one of the actuation devices. Depending on which separate operational area or which section of a single operational area the palm or back of a hand of the vehicle occupant is present in, a corresponding actuation device may be actuated.

According to another exemplary embodiment, the vehicular actuating system includes a voice input unit to which the vehicle occupant may input vocal information about an operation member or actuation device that the occupant desires to operate. The vocal information may include not only information indicating the operation member itself, but also information directly or indirectly suggesting the operation member. In the second operation mode, when the operation member is specified based on the information inputted to the voice input unit and when it is determined, based on the three-dimensional image detected by the detecting unit, that the palm or back of a hand of the vehicle occupant exists in the operational area, the control unit sends a signal to operate the actuation device corresponding to the operational area where the detection occurred.

Information about the operation member to operate is inputted by a vocal message or command and is announced beforehand. The vocal message or command specifies the actuation device that the vehicle occupant desires to operate and may reduce malfunction of the actuation device.

According to another exemplary embodiment, when in the second operation mode, the control unit determines a behavior of the palm or back of hand of the vehicle occupant in the operational area based on the three-dimensional image detected by the detecting unit and sends a signal to change the action of the actuation device according to the behavior of the palm or back of hand. The behavior of the palm or back of the hand of the vehicle occupant may include the movement amount, movement speed, acceleration, or the amount of time the palm or back of hand is in the operational area.

The vehicle occupant may move a hand corresponding to a desired action of the actuation device and enabling fine control of the actuation device without directly using the operation member manually.

According to various exemplary embodiment, a vehicle generally includes at least an engine/running system, an electrical system, a vehicle control device; and vehicular actuation system as mentioned above. The engine/running system is a system involving an engine and a running mechanism of the vehicle. The electrical system is a system involving electrical parts used in the vehicle. The vehicle control device is a device having a function for controlling the actuation of the engine/running system and the electrical system. A vehicle may be provided in which the vehicular actuation system is capable of operating an actuation device without directly using an operation member manually.

The vehicular actuation system includes an actuation device operated when an operation member for the actuation device is used by a vehicle occupant. Easy operation of the actuation device is enabled by detecting a three-dimensional image in an operational area of the operation member, determining whether or not a palm or back of a hand of the vehicle occupant is present in the operational area based on the detected three-dimensional image, and operating the actuation device when it is determined that the palm or back of the hand of the vehicle occupant is present in the operational area.

Hereinafter, various embodiments will be described with reference to drawings.

A system configuration of a vehicular actuation system 100 of an exemplary embodiment is shown in FIG. 1. The vehicular actuation system 100 is installed in an automobile and includes at least a photographing device 110, a control device 120, an ECU 170, and an actuation device 180. The vehicle may also include an engine/running system involving an engine and a running mechanism of the vehicle, an electrical system involving electrical parts used in the vehicle, and a vehicle control device for conducting the actuation control of the engine/running system and the electrical system.

The photographing device 110 includes a 3D camera 112 and a data transfer circuit. The 3D camera 112 is a 3-D (three-dimensional) camera (sometimes called "monitor") of a C-MOS or CCD (charge-coupled device) type in which light sensors are arranged into an array (lattice) structure. The 3D camera 112 is typically disposed, for example, at a central portion in the lateral direction of a dashboard or an area around an inner rearview mirror in order to take an image of an occupant in a driver seat or an occupant in a front passenger seat. The camera may take three-dimensional images from a single view point. Distances relative to the occupant in the driver seat and the occupant in the front passenger seat are measured a plurality of times to detect a three-dimensional surface profile, thereby periodically measuring a plurality of times the information about the occupant in the driver seat and the occupant in the front passenger seat. As the 3D camera 112, a 3-D type monocular C-MOS camera or a 3-D type pantoscopic stereo camera as a noncontact-type three-dimensional measuring device may be employed. Instead of the 3D camera 112, a 3D scanner capable of obtaining three-dimensional images may be used.

Mounted on the vehicular actuation system 100 may be a power source unit for supplying power from a vehicle battery to the 3D camera 112. The 3D camera 112 may be set to start its photographing operation when the ignition key is turned ON or when a seat sensor (not shown) installed in the driver seat detects an occupant sitting in the driver seat.

The control device 120 further includes at least an image processing unit 130, a computing unit (MPU) 140, a storing unit 150, an input/output unit 160, and peripheral devices (not shown). The control device 120 has a function of detecting a three-dimensional image about a certain actuation area C (an actuation area in a predetermined range from an operation member 180*a* as will be described later) from an image taken by the 3D camera 112 and also a function of controlling the actuation device 180 based on the detected information.

The image processing unit 130 controls the camera to obtain good quality images and control image processing of the images taken by the 3D camera 112 to be used for analysis. Specifically, the image processing unit 130 may control the adjustment of the frame rate, the shutter speed, the sensitivity, the accuracy correction, the dynamic range, the brightness, and/or the white balance. The image processing unit 130 may also control spin compensation for the image, correction for distortion of the lens, a filtering operation, and a difference operation as image preprocessing and recognition operations are conducted. The three-dimensional image of the vehicle occupant's hand taken by the 3D camera 112 is represented by picture elements within an XYZ coordinate system. The "picture element" used here is sometimes called a "pixel" which is a colored "point" as a unit composing a digital image, and may contain information about distance (depth), degree of transparency, etc.

Figure 2:
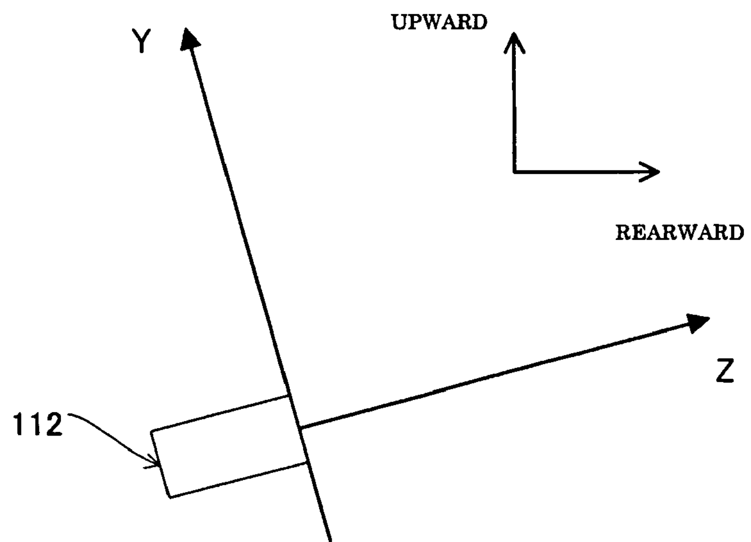
FIG. 2 is a side view of a coordinate system A (X, Y, Z) when the 3D camera shown in FIG. 1 is put on a dashboard according to an exemplary embodiment.
Figure 3:
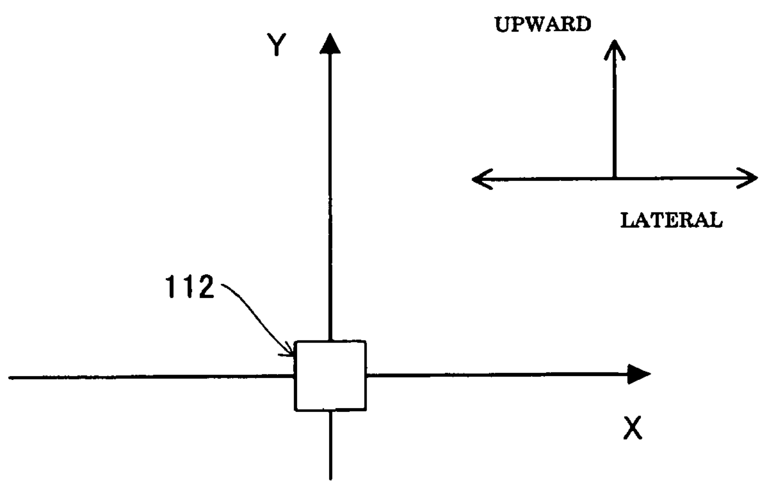
FIG. 3 is a rear view of the coordinate system A (X, Y, Z) shown in FIG. 2 according to an exemplary embodiment.
Figure 4:
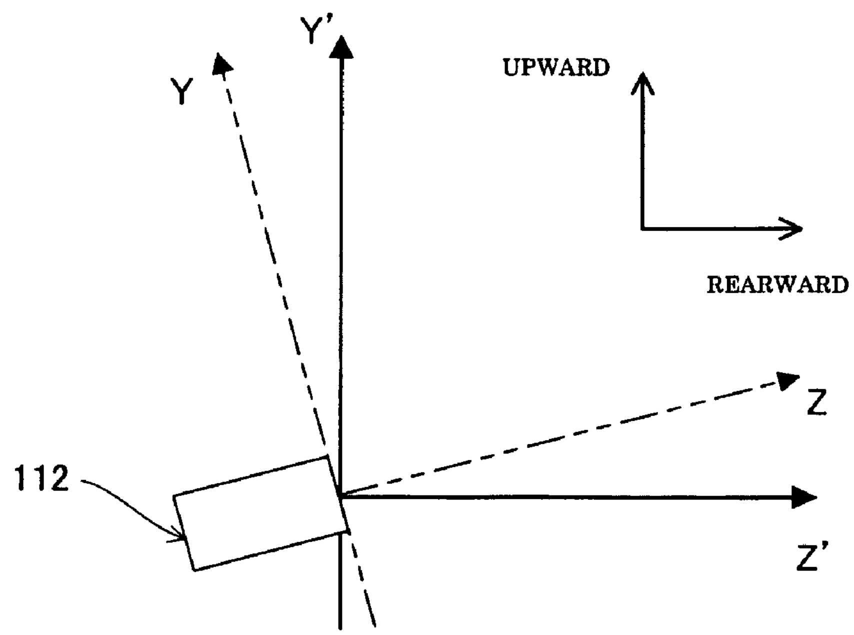
FIG. 4 is a side view of a coordinate system B (X', Y', Z') when the 3D camera shown in FIG. 1 is put on the dashboard according to an exemplary embodiment.
Figure 5:
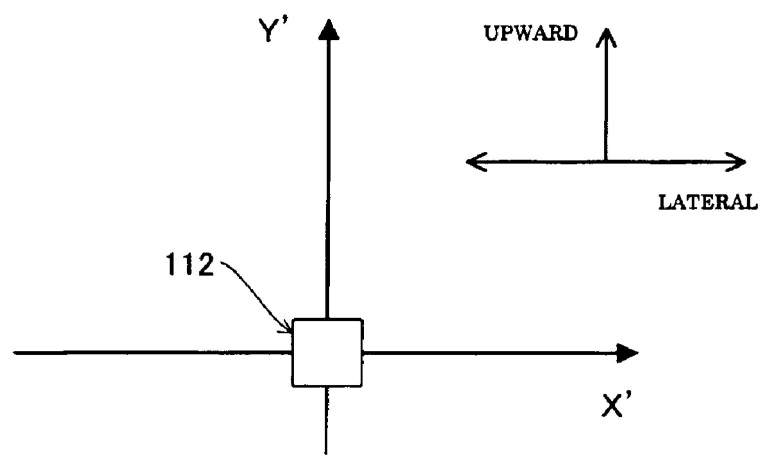
FIG. 5 is a rear view of the coordinate system B (X', Y', Z') shown in FIG. 4 according to an exemplary embodiment.

The three-dimensional image of the vehicle occupant is preferably converted from a coordinate system A (X, Y, Z) with an origin at the center of the 3D camera 112 into a coordinate system B (X', Y', Z') with an origin at the center of the vehicle body. FIG. 2 shows a side view of the coordinate system A (X, Y, Z) when the 3D camera 112 shown in FIG. 1 is placed on the dashboard. FIG. 3 shows a rear view of the coordinate system A (X, Y, Z) shown in FIG. 2. FIG. 4 shows a side view of the coordinate system B (X', Y', Z') when the 3D camera 112 shown in FIG. 1 is placed on the dashboard. FIG. 5 shows a rear view of the coordinate system B (X', Y', Z') shown in FIG. 4. In the coordinate system B with the origin at the center of the vehicle body, the X'-axis extends in parallel with the floor of the vehicle body and the lateral direction of the vehicle, the Y'-axis extends perpendicular to the floor of the vehicle body and in parallel with the vertical direction of the vehicle, and the Z'-axis extends in parallel with the floor of the vehicle and the anteroposterior direction of the vehicle. The conversion of the coordinate system A to coordinate system B facilitates the definition of an operational area C.

The computing unit 140 processes the information from the image processing unit 130 and includes an information extracting section 142 and a determination processing section 144. The information extracting section 142 has a function of extracting (sometimes referred to as "detecting") three-dimensional image of the predetermined operational area C from the information obtained by the image processing unit 130. The determination processing section 144 determines based on the three-dimensional image of the operational area C extracted by the image extracting section 142 whether or not a palm or a back of a hand of the vehicle occupant (e.g., a part from a wrist to the end of a hand including fingers) is present in the operational area C. The determination process is conducted by determining whether or not the size of a detected body part is equal or similar to a palm or back of a hand that is previously defined or alternatively determining whether or not there is a detected part of which the size is equal or similar to a palm or back of a hand in the operational area C. When it is determined that the palm or back of a hand of the vehicle occupant exists in the operational area C, a control signal for operating the actuation device 180 is outputted.

The storing unit 150 is a device that may store or record data for correction, buffer frame memory for preprocessing, defined data for recognition computing, reference patterns, information about the operational area C previously set in the computing unit 140, the computed results of the computing unit 140, and/or operation control software.

The input/output unit 160 inputs information about the vehicle, information about traffic conditions around the vehicle, information about weather condition and about time zone as well as the determination results by the computing unit 140 to the ECU 170 for conducting controls of the entire vehicle and outputs recognition results. Information about the vehicle may include collision prediction information of the vehicle taken by a radar or camera, the state (i.e., open or closed) of a vehicle door, the wearing of a seat belt, the operation of brakes, the vehicle speed, the steering angle, etc.

The actuation device 180 is a device that may be operated by a control signal from the ECU 170. The actuation device 180 includes an operation member 180*a* to be manipulated by the vehicle occupant. By directly manipulating the operation member 180*a*, the actuation device 180 is operated or the mode of the actuation device 180 is changed. The operation mode may be a mode in which the actuation device 180 is operated by directly manipulating the operation member 180*a* and corresponds to a first operation mode. Examples of the actuation device 180 may include lights located outside and/or inside of the vehicle, an air conditioner, side mirrors, a car navigation system, an audio system, etc. Examples of the operation member 180*a* of the actuation device 180 may include switches and/or buttons of various types such as a slide type, push type, or rotary type.

According to an exemplary embodiment, if determination processing section 144 determines that the palm or back of a hand of the vehicle occupant is present in the predetermined operational area C (and thus the vehicle occupant desires to operate the actuation device 180), the ECU 170 outputs a signal for operating the actuation device 180. A second control mode may be active such that the actuation device 180 is operated by non-contact manipulation of the operation member 180*a*. According to various exemplary embodiments, any determination processing section and/or ECU may be used that is capable of outputting a signal to the actuation device 180 based on the output of the computing unit 140. According to one exemplary embodiment, the ECU 170 may be located between the computing unit 140 and the actuation device 180 as shown in FIG. 1 and the computing unit 140 may directly output a signal to the actuation device 180.

Hereinafter, a first process conducted by the computing unit 140 according to various exemplary embodiments is described with reference to FIG. 6 and FIG. 7.

Figure 6:
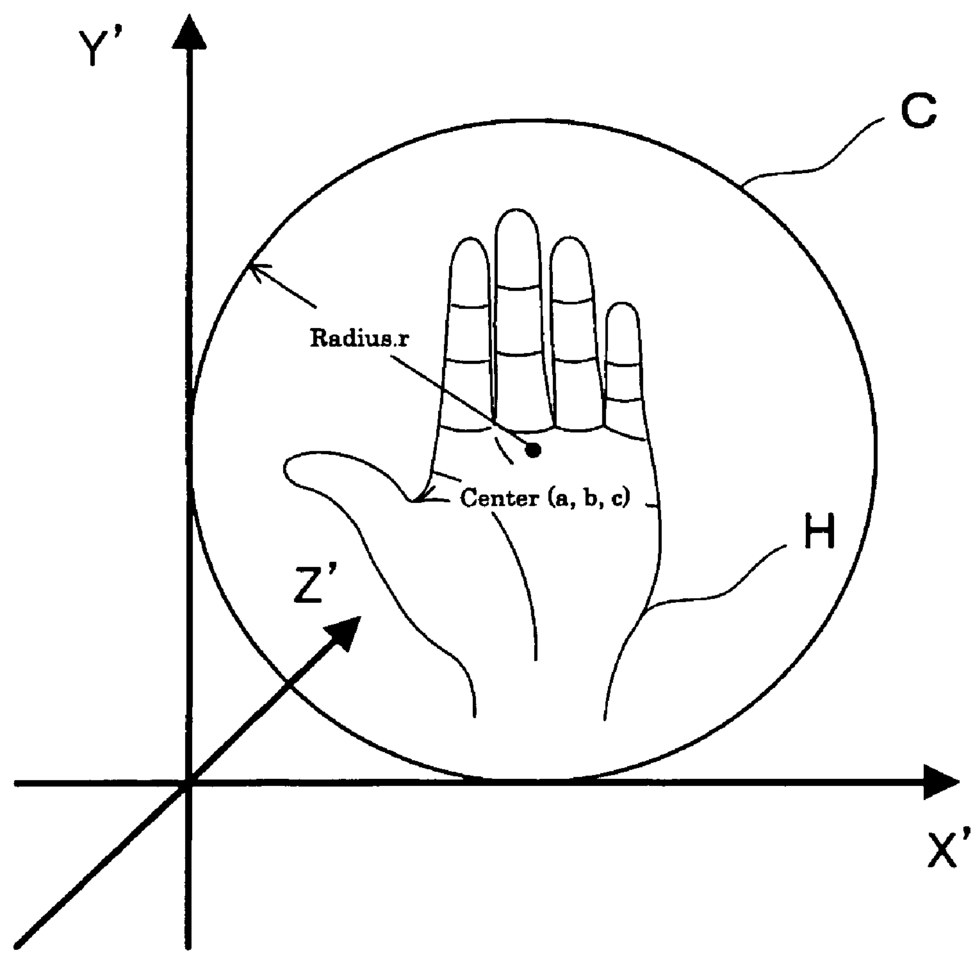
FIG. 6 is an illustration schematically showing an aspect of detecting the presence of a palm or back of a hand of a vehicle occupant within an operational area of a predetermined range about an operation member according to an exemplary embodiment.

FIG. 6 schematically shows an aspect of detecting the existence of the palm or back of a hand H of the vehicle occupant within the operational area C of a predetermined range about the operation member 180*a*. In the exemplary embodiment shown in FIG. 6, the operational area C is defined as an inner space of a generally spherical area of which the radius is "r" and the center is (a, b, c) relative to the X'-axis, Y'-axis, and Z'-axis. The operational area C is an area defined according to an expression: (x−a)2+(y−b)2+(z−c)2≦r2. The computing unit 140 determines that an object (i.e., a detected subject) exists in the operational area C when the number of pixels "p" existing in the area defined by the expression is equal to or more than a threshold value "m". Further, the computing unit 140 determines that the object existing in the operational area C is the palm or back of a hand of the vehicle occupant when the number of pixels "p" is equal to or less than a threshold value "n," which may be greater than "m." It is determined that the object having a size corresponding to the palm or back of the hand of the vehicle occupant exists in the operational area C when a relation relative to the number of pixels "p" expressed by m≦p≦n is established. The values "m" and "n" relating to the number of pixels "p" may be predetermined values stored in the storing unit 150. According to one exemplary embodiment, the values "m" and "n" may be: m=200 and n=300.

According to other exemplary embodiments, the operational area set for detecting the existence of the palm or back of a hand of the vehicle occupant may be defined as various forms such as a cube or a rectangular parallelepiped, instead of a sphere as in operational area C. The size of the operational area space around the operation member 180*a* may be set according to the size of a specific or typical palm or back of a hand.

FIG. 7 shows a flow diagram of how the actuation device 180 may be actuated based on the detection of the palm or back of the hand H of the vehicle occupant in the operational area C shown in FIG. 6. As shown in FIG. 7, as the vehicle occupant moves his or her hand H to the operational area C for operating the actuation device, the palm or back of the hand H is detected by the 3D camera 112. When the computing unit 140 determines that the palm or back of hand H of the vehicle occupant exists in the operational area C, the system may determine that the vehicle occupant desires to operate the actuation device 180 and may control operation of the actuation device 180. For example, when the system determines that the palm or back of a hand of the vehicle occupant exists in the operational area of a switch for a courtesy light, the courtesy light may be turned on even when the switch for the courtesy light is not directly operated. When it is determined that the palm or back of hand of the vehicle occupant exists in the operational area of a switch for an audio system, the audio system may be actuated even when the switch for the audio system is not directly operated. After operation of the actuation device 180, the actuation device 180 may be automatically stopped after a lapse of predetermined time period or the actuation device 180 may be stopped when the palm or back of hand H of the vehicle occupant is detected in the operational area C again after a lapse of predetermined time period.

According to various exemplary embodiments the photographing device 110 may be a single photographing device (the 3D camera 112 or the like) capable of detecting three-dimensional images at one or more operational areas or may be composed of a plurality of photographing devices. The operational areas may be areas separate from each other or respective sections of a single operational area. For example, when controls for at least two actuation devices such as an air conditioner and an audio system are conducted by a single photographing device and the operation members of the actuation devices are positioned close to each other, a first section of a single operational area may be defined as the operational area for the actuation of the air conditioner and a second section of the single operational area may be defined as the operational area for the actuation of the audio system. Depending on what section of the single operational area the palm or back of the hand of the vehicle occupant exists in, it is specified which actuation device must be actuated.

A second process that may be conducted by the computing unit 140 according to various exemplary embodiments is described with reference to FIG. 8 and FIG. 9.

Figure 8:
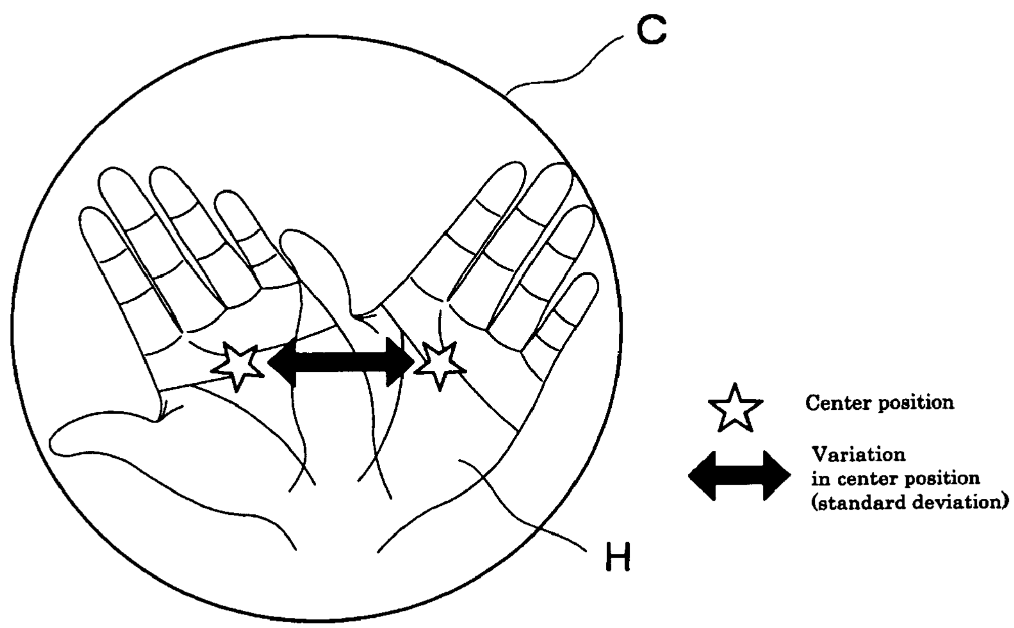
FIG. 8 is a schematic illustration showing detection of a change in the center position of the palm or back of the hand of the vehicle occupant in the operational area of FIG. 6 according to an exemplary embodiment.

FIG. 8 schematically shows an aspect of detecting the behavior of the palm or back of hand H of the vehicle occupant in the predetermined operational area C including the operation member 180*a*. In the illustrated embodiment shown in FIG. 8, the behavior of the palm or back of the hand H of the vehicle occupant is detected based on changes in the center position of pixels in the operational area C. Specifically, if coordinate of the pixels in the operational area C is (Xk, Yk, Zk) and the number of pixels is N, then Σ is a sum of k=1 through N and the center position of the pixels is obtained by an expression (Σ(Xk)/N, Σ(Yk)/N, Σ(Zk)/N). By computing the standard deviation of the center position of the pixels within a certain period of time, the system may determine the amount of movement of the hand H in the operational area C. The kind of behavior of the palm or back of the hand H of the vehicle occupant may be determined according to the amount of movement. The system may also be capable of determining the moving speed, acceleration, or staying time of the hand H as well as the movement amount within the operational area C.

Figure 9:
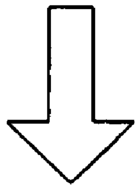
FIG. 9 is a diagram showing a process flow of how the actuation device is operated based on the detection of the change of center position of the palm or back of the hand of the vehicle occupant as in FIG. 8 according to an exemplary embodiment.
Figure 9:
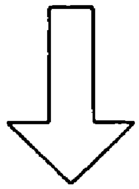
Figure 9:
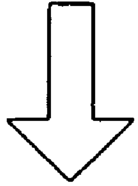

FIG. 9 shows a flow diagram of how the actuation device 180 is operated based on the detection of the behavior of the palm or back of the hand H of the vehicle occupant in the operational area C shown in FIG. 8. As shown in the exemplary embodiment of FIG. 9, as the vehicle occupant moves his or her hand H to the operational area C and performs specific behavior for actuating the actuation device, the palm or back of the hand H is detected by the 3D camera 112. When the computing unit 140 determines that the palm or back of hand H of the vehicle occupant is present in the operational area C and further detects the specific behavior of the palm or back of hand H, the system may determine that the vehicle occupant desires to operate the actuation device 180 in a predetermined mode. For example, when vertical motion of the clenched hand of the vehicle occupant is detected in an operational area of a switch for the audio system, a control signal for increasing the sound volume of the audio system may be sent and processed even when the switch for the audio system is not directly manipulated. According to one exemplary embodiment, after operation of the actuation device 180, the system may automatically stop the actuation device 180 after a lapse of a predetermined amount of time. According to another exemplary embodiment, the system may stop the actuation device 180 when the palm or back of the hand H of the vehicle occupant is detected in the operational area C again after a lapse of predetermined time period.

In a third process that may be conducted by the computing unit 140 according to an exemplary embodiment, the vehicle occupant gives a voice message of information to specify the actuation device 180 corresponding to the operation area C before the vehicle occupant moves his or her hand H to the operational area C according to the first process. A voice input unit 190 shown by a chain double-dashed line in FIG. 1 may be added as a system component, for example as a microphone, to receive voice input. The voice input unit 190 is a unit to which information about an operation member that the vehicle occupant desires to operate is inputted by the voice message.

In the third process, the vehicle occupant inputs, vocal information about the operation device 180 to the voice input unit 190 specifying the operation member to be operated. The information about the operation device 180 may include a word indicating the operation device 180 itself or a sentence including the word. Based on the information inputted in the voice input unit 190, the computing unit 140 operates the actuation device 180 when the operation member corresponding to the operational area where the hand is detected is the operation member desired by the occupant. For example, when the system determines that the palm or back of the hand of the vehicle occupant is present in the operational area of a switch for the audio system after the vehicle occupant gives a voice message about the audio system (e.g., vocalizes "audio," "operate the audio system," etc.), the audio system is operates even when the switch for the audio system is not directly operated.

In a fourth process that may be conducted by the computing unit 140 of an exemplary embodiment, the vehicle occupant gives a voice message for specifying the actuation device 180 corresponding to the operation area C before the vehicle occupant moves his or her hand H to the operational area C according to the second process. A voice input unit 190 similar to that of the third process may be added as a system component.

In the fourth process, the vehicle occupant inputs information about the operation device 180 to the voice input unit 190 via the voice message. The operation member that vehicle occupant desires to manipulate is specified. Based on the information inputted in the voice input unit 190, the computing unit 140 operates the actuation device 180 when the operation member corresponding to the operational area C where the hand is detected is the same as operation member desired by the occupant and changes the action of the actuation device 180 based on the behavior of the hand H. For example, when vertical motion of the clenched hand of the vehicle occupant is detected in the operational area of a switch for the audio system after the vehicle occupant gives a voice message about the audio system (e.g., vocalizes "audio," "operate the audio system," etc.), a control signal for increasing the sound volume of the audio system may be sent and processed even when the switch for the audio system is not directly operated.

As described above, according to various exemplary embodiments of the vehicular actuation system 100 or the vehicle to which the vehicular actuation system 100 is installed, there may be at least a first operation mode in which the operation member **180*a* is directly manipulated by the vehicle occupant to operate the actuation device 180 and a second operation mode in which the actuation device 180 is operated even when the operational member 180 is not directly manipulated, for example by non-contact manipulation of the operational member 180. The vehicle occupant may select the first operation mode or the second operation mode for operating the actuation device 180 before and after driving and during stoppage of the vehicle and may select the second operation mode for operating the actuation device during driving. If the vehicle occupant is sitting in a normal position and attempts to directly operate the operation member 180*a* of a small size while driving, the occupant may be required to look for the operation member 180*a* and/or be out of the normal position so that the vehicle occupant's attention is diminished. However, if the vehicle occupant selects the second operation mode only requiring the movement of the hand into the operational area around the operation member 180*a*, the allowable range for the hand for actuating the actuation device 180 is increased, allowing for easier operation of the actuation device 180** and reducing the possibility that the vehicle occupant's attention is diminished.

By the first through fourth processes based on the three-dimensional images taken by the 3D camera 112, the information in the intended operational area may be precisely detected. When using three-dimensional images, the processes may increase the degree of precision in detection as compared to when using two-dimensional images because information may be extracted according to distances even when there is a small difference in color between the background and the vehicle occupant or a small difference in color between the skin and the clothes.

Similar to the second process described above, the vehicle occupant may select behavior of the hand corresponding to a desired operation of the actuation device to enable fine control for the actuation device without directly manipulating the operation member manually.

Similar to the third and fourth processes described above, information about the intended operation member which will be operated may be inputted by a voice message. The voice message may specify the actuation device desired for use by the vehicle occupant and reduce the possibility of malfunction of the actuation device.

The Japanese priority application JP 2006-353195, filed Dec. 27, 2006, including the specification, drawings, claims and abstract, is incorporated herein by reference in its entirety.

The present invention is not limited to the aforementioned embodiments and various applications and modifications may be made. For example, although the exemplary embodiments described above have been described with regard to the vehicular actuation system 100 installed in an automobile, according to other exemplary embodiments, the present invention may be adopted to vehicular actuation systems to be installed in various vehicles such as an automobile, an airplane, a boat, a bus, and a train.

What is claimed is:

1. A vehicular actuation system that is installed in a vehicle comprising:

an actuation device that includes an operation member manipulated by a vehicle occupant;

a detecting unit for detecting a three-dimensional image in an operational area of a predetermined range located about said operation member, said operational area being a space spanning from the operational member to a position from the operation member; and a control unit that determines based on the detected three-dimensional image whether or not a palm or a back of a hand of the vehicle occupant is present in said operational area, wherein the control unit operates said actuation device when the palm or back of the hand of the vehicle occupant is present in said operational area;

wherein said vehicular actuation system includes a first operation mode in which said operation member is directly manipulated by the hand of the vehicle occupant to operate said actuation device and a second operation mode in which said actuation device is operated by said control unit.

2. A vehicular actuation system as claimed in claim 1, further comprising:

a voice input unit to which the vehicle occupant inputs voice information related to a desired operation member to be operated;

wherein in said second operation mode, when said desired operation member is specified based on the information input to said voice input unit and when it is determined, based on the three-dimensional image detected by said detecting unit, that the palm or back of the hand of the vehicle occupant exists in said operational area, said control unit operates said actuation device when the operation member corresponding to the operational area where the palm or back of hand is detected is the desired operation member.

3. A vehicular actuation system as claimed in claim 1, wherein in said second operation mode, said control unit determines a behavior of the palm or back of the hand of the vehicle occupant when it is determined, based on the three-dimensional image detected by said detecting unit, that the palm or back of the hand of the vehicle occupant is present in said operational area, and changes an action of said actuation device according to the behavior of the palm or back of the hand.

4. A vehicle comprising:

an engine/running system;

an electrical system;

a vehicle control device for controlling actuation of said engine/running system and said electrical system; and a vehicular actuation system as claimed in claim 1.

5. A vehicular actuation system as claimed in claim 1, wherein the detecting unit comprises a photographing device including a three dimensional camera and a data transfer circuit; and wherein the control unit includes an image processing unit.

6. The system as claimed in claim 5, wherein the image processing unit is configured to control operation of the camera.

7. The system as claimed in claim 6, wherein the image processing unit controls adjustment of one or more the following operational characteristics of the camera: frame rate, shutter speed, sensitivity, dynamic range, brightness, and/or white balance.

8. The system as claimed in claim 6, wherein the image processing unit is configured to perform one or more of the following functions related to an image detected by the camera: spin compensation, correction for distortion due to a lens of the camera, a filtering operation, and a difference operation as image preprocessing and recognition operations.

9. The system as claimed in claim 5, wherein the control unit further includes a computing unit configured to process information received by the image processing unit, and wherein the computing unit includes an information extracting section configured to extract the three-dimensional image from the information obtain from the image processing unit.

10. The system as claimed in claim 9, wherein the control unit further includes a determination processing section that is configured to determine whether or not the palm or the back of the hand of the vehicle occupant is present in the image.

11. The system as claimed in claim 9, wherein the extracted image is located in the operational area.

12. The system as claimed in claim 5, wherein the operation member is configured so that when the vehicle occupant manipulates the operation member, the actuation device is operated or the mode of the vehicular actuation system is changed.

* * * * *